United States Patent
Khan et al.

(10) Patent No.: US 6,579,462 B2
(45) Date of Patent: Jun. 17, 2003

(54) PLASMA ADDRESSED LIQUID CRYSTAL DISPLAY WITH GLASS SPACERS

(75) Inventors: Babar A. Khan, Ossining, NY (US); Henri R. J. R. Van Helleputte, Eindhoven (NL); Adrianus L. J. Burgmans, Eindhoven (NL); Karel Elbert Kuijk, Dommelen (NL); Petrus F. G. Bongaerts, Waalre (NL); Jacob Bruinink, Eindhoven (NL); Thomas Stanley Buzak, Beaverton, OR (US); Kevin John Ilcisin, Beaverton, OR (US); Paul Christopher Martin, Vancouver, WA (US)

(73) Assignees: Philips Electronics North America Corporation, New York, NY (US); Tektronix, Inc., Wilsonville, OR (US)

( * ) Notice: Subject to any disclaimer, the term of this patent is extended or adjusted under 35 U.S.C. 154(b) by 0 days.

(21) Appl. No.: 09/875,535

(22) Filed: Jun. 6, 2001

(65) Prior Publication Data

US 2001/0026121 A1 Oct. 4, 2001

Related U.S. Application Data

(62) Division of application No. 08/588,800, filed on Jan. 19, 1996, now Pat. No. 6,433,471.

(51) Int. Cl.[7] ............... H01J 1/62; H01J 9/24
(52) U.S. Cl. .............. 216/23; 216/24; 216/33; 216/52; 216/56; 216/67; 216/80; 216/97; 445/24
(58) Field of Search ................. 313/483, 484, 313/495, 582, 584; 216/23, 24, 33, 52, 56, 67, 80, 97; 445/24

(56) References Cited

U.S. PATENT DOCUMENTS

| | | | | |
|---|---|---|---|---|
| 5,121,254 A | * | 6/1992 | Hamanaka et al. | 359/619 |
| 5,276,384 A | * | 1/1994 | Martin | 313/582 |
| 5,440,201 A | * | 8/1995 | Martin et al. | 313/582 |
| 5,525,862 A | * | 6/1996 | Miyazaki | 313/582 |
| 5,528,109 A | * | 6/1996 | Ilcisin et al. | 315/169.4 |
| 5,561,343 A | * | 10/1996 | Lowe | 313/482 |
| 5,565,742 A | * | 10/1996 | Shichao et al. | 315/366 |
| 5,587,623 A | * | 12/1996 | Jones | 313/497 |
| 6,061,074 A | * | 5/2000 | Bartha et al. | 347/123 |
| 6,309,057 B1 | * | 10/2001 | Kobayashi et al. | 347/71 |

* cited by examiner

Primary Examiner—Anita Alanko

(57) ABSTRACT

A flat display device, preferably of the PALC type, in which the plasma channels are formed by etching laterally-spaced slots in a spacer plate, attaching a thin dielectric sheet over the etched spacer plate, and bonding the etched spacer plate to a transparent substrate such that each channel is formed by the portion of the substrate between flanking walls formed by the etched slots in the spacer plate, adjacent flanking walls in the spacer plate, and the overlying portion of the thin dielectric sheet. In a modification, strengthening crossbars are formed between adjacent flanking walls.

12 Claims, 4 Drawing Sheets

PLASMA ADDRESSED LIQUID CRYSTAL DISPLAY WITH GLASS SPACERS

CROSS REFERENCE TO RELATED APPLICATIONS

This is a divisional of application Ser No. 08/588,800, filed Jan. 19, 1996 now U.S. Pat. No. 6,433,471.

RELATED APPLICATIONS 1) application Ser No. 08/384,090, filed Feb. 6, 1995, now U.S. Pat. No. 5,914,562, issued Jun. 22, 1999.
2) application Ser No. 08/413,052, filed Mar. 29, 1995, now U.S. Pat. No. 5,596,431, issued Jan. 21, 1997.
3) application Ser No. 08/573,742, filed Dec. 18, 1995, now U.S. Pat. No. 5,764,001, issued Jun. 9, 1998.

BACKGROUND OF INVENTION

This invention relates to plasma channels, to display devices comprising plasma channels, and to plasma-addressed liquid crystal display panels commonly referred to as "PALC" display devices using such channels. PALC devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of the backlight or incident light to each LC pixel is a function of the stored voltage across the pixel. A more detailed description is unnecessary because the construction, fabrication, and operation of such PALC devices have been described in detail in the following U.S. patents and publication, the contents of which are hereby incorporated by reference: U.S. Pat. Nos. 4,896,149; 5,077,553; 5,272,472; 5,276,384; and Buzak et al., "A 16-Inch Full Color Plasma Addressed Liquid Crystal Display", Digest of Tech. Papers, 1993 SID Int. Symp., Soc. for Info. Displ. pp. 883–886.

A partial perspective view of the PALC display described in the 1993 SID Digest is shown in FIG. 2. The method described in the referenced publication for making the plasma channels is to chemically etch a flat glass substrate to form parallel semi-cylindrically shaped recesses defined by spaced ridges or mesas and to bond on top of the mesas a thin dielectric cover sheet having a thickness in the range of about 30–50 $\mu$m.

The above construction and its fabrication encounters certain problems. Since the channel electrodes must be patterned on the sloping sidewall of the channel, the dimensions and placement of the electrodes cannot be accurately controlled. Moreover, since slight variations in processing conditions can alter the etch rate, the channel etching process is difficult to control; hence the depth of the channel, which is dependent on control of the etching process, is difficult to control.

European Patent 0 500 084 A2 describes the formation of channels by patterning of electrodes on a flat substrate, providing spacers on the flat substrate, and placing the thin glass sheet on top of the spacers. The discharge space thus extends continuously across the electrodes. However, the continuous discharge space will lead between channels to crosstalk which is difficult to avoid. Moreover, the spacers have to be formed on the flat substrate by deposition and/or etching processes, such as screen printing. Since the spacers have to be as thick as the required channel depth (~100 microns or more) the fabrication of the spacers adds complexity to the process.

European Patents 0 500 085 A2 and 0554 851 A1 describe the formation of channels by screen printing partition walls. However, this is also a difficult process, which may require multiple coats to obtain the required wall height.

SUMMARY OF INVENTION

An object of the invention is an improved channel plate.

A further object of the invention is an improved plasma-addressed display device.

Another object of the invention is an improved method for fabricating the plasma channels of a PALC display device.

In accordance with a first aspect of the invention, a channel plate comprises a dielectric substrate and a thin dielectric sheet-like member arranged over and spaced from the substrate by a plurality of laterally spaced, channel-defining spacer members each formed as part of a dielectric sheet patterned by through-holes, which latter sheet is herein referred to as the spacer sheet or plate. The holes are configured to form the desired channel configurations, typically elongated parallel channels, which preferably are straight but which also may be curved while still maintaining a substantially parallel relationship. The height of the spacer sheet above the substrate determines the height of the channels, which are each formed by the portion of the substrate surface extending between adjacent flanking spacers, the flanking spacers themselves forming the channel walls, and the overlying portion of the thin dielectric sheet-like member. Spaced electrodes are provided in each channel as well as a plasma-forming atmosphere. The channels are formed when the three sheet-like members—the substrate, the spacer plate, and the thin dielectric sheet—are assembled and bonded together.

In accordance with a second aspect of the invention, the patterning of the spacer sheet is such as to provide strengthening crossbars extending preferably transverse to and between adjacent spacer members. The crossbars may have a different height than that of the spacers.

In accordance with a first preferred embodiment of the invention, the substrate is of glass, the thin dielectric sheet is of glass, and the spacer sheet is a glass plate, with the through-holes in the form of slots made by chemical or plasma etching or by mechanical means such as sandblasting. The three glass members may be bonded together using fused glass frit as described in several of the cited patents and publications, or by anodic bonding as described in the first related patent application identified above.

In accordance with a another preferred embodiment of the invention, the channel plate is part of a PALC display device, and the combination of the substrate, patterned spacer plate and the overlying thin dielectric sheet-like member, together with the electrodes constitutes the plasma channels or channel plate of the PALC display device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
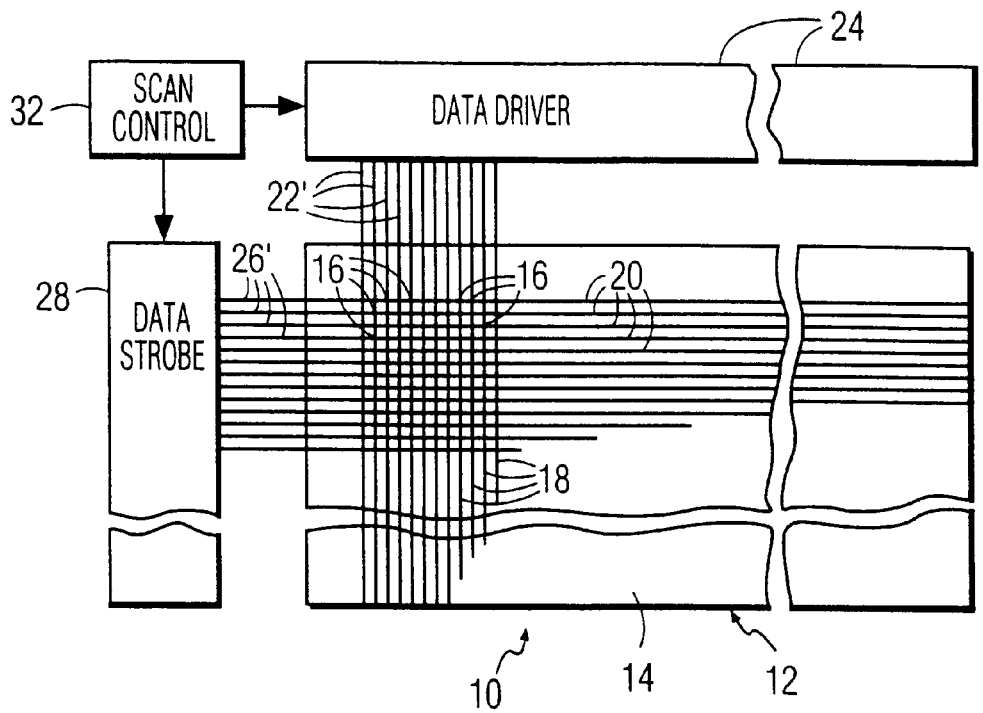
FIG. 1 is a schematic block diagram of a conventional flat panel display system.

FIG. 1 shows a flat panel display system 10, which represents a typical PALC display device ahd the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22'by different ones of output amplifiers 23 (FIG. 2) of a data driver or drive circuit 24, and channels 20 receive data strobe signals of the voltage pulse type developed on parallel output conductors 26'by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layer of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
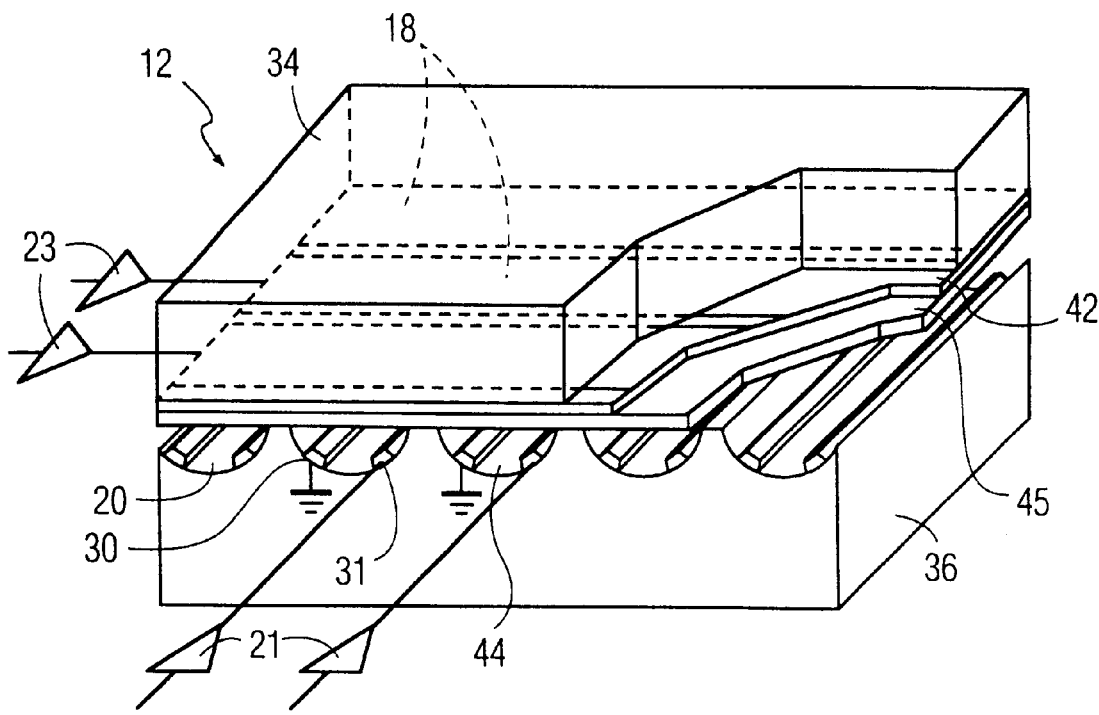
FIG. 2 is a perspective view of part of a conventional PALC display device.

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, typically only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the cathode 31 and anode 30 electrodes. A thin dielectric glass microsheet 45 is then sealed across the peripheral edges of the device to form with the ridges 50 the channels 20, which are then exhausted, back-filled with a low-pressure ionizable gas such as helium and/or neon and optionally with a small percentage of other noble gases and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

Figure 3:
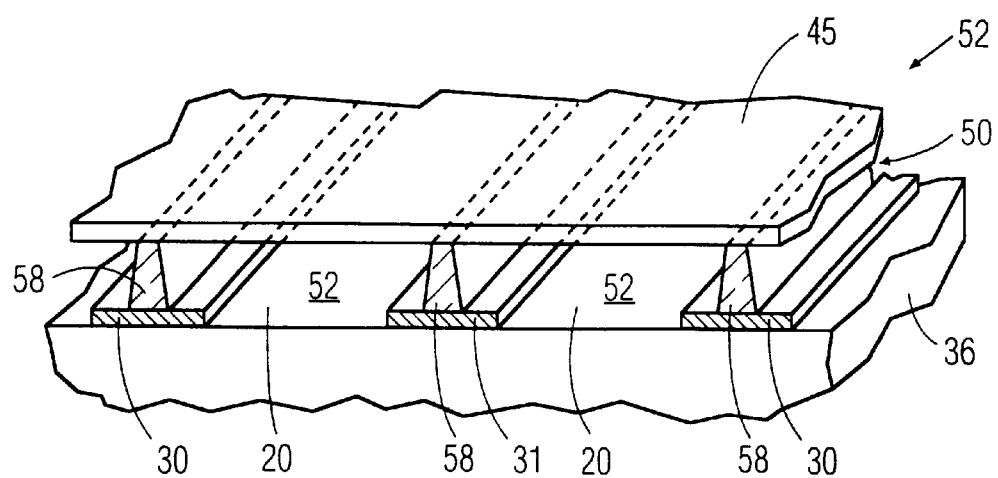
FIG. 3 is a perspective view of a part of one form of a channel plate according to the invention for use in a PALC color display.

FIG. 3 is a perspective view of part of one form of channel plate 52 in accordance with the invention for one form of liquid crystal display panel in accordance with the invention. A thick flat glass bottom plate 36 forms a substantially transparent dielectric substrate for the plasma channels 20. Over the bottom plate 36 is deposited spaced electrode layer portions 30, 31.

Figure 4:
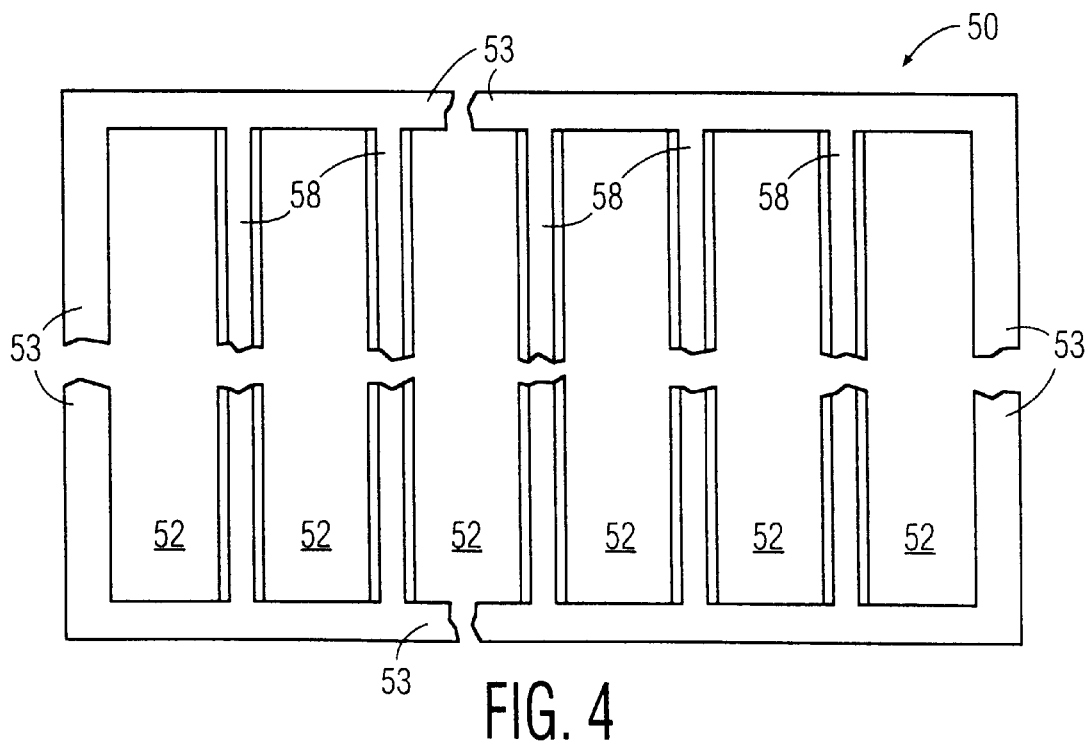
FIG. 4 is a top view of the spacer plate used in that channel plate.

In accordance with the invention, the channels walls are formed in a transparent dielectric sheet 50 substantially equal in thickness to the required channel depth. The dielectric sheet 50 is preferably of an etchable material, such as glass. This is accomplished with glass by etching through-holes 52 in the glass using conventional masking and etching processes as shown in FIG. 4.

Figure 6:
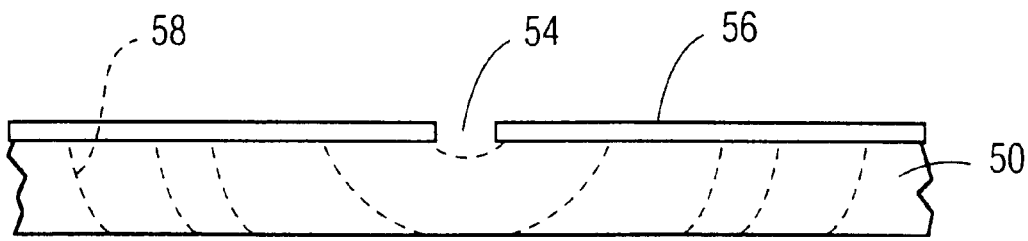
FIGS. 6 and 7 are schematic views indicating two different ways of etching the spacer plate used in the embodiments of FIGS. 3–5.
Figure 7:
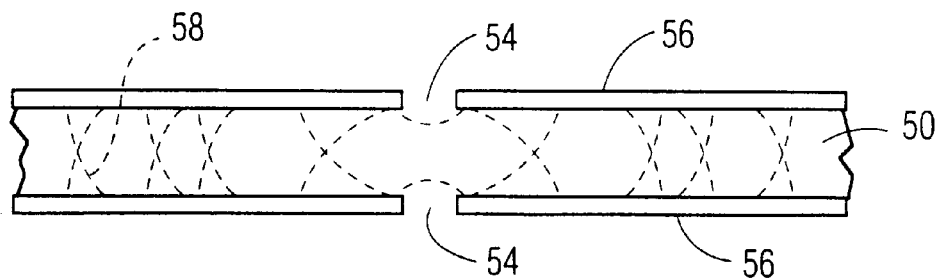

FIGS. 6 and 7 illustrate two preferred ways for etching the glass to make the hole walls as close to the vertical as possible. This can be done as shown in FIG. 6 by starting with a relatively small opening 54 in an etch mask 56 and etching a hole 58 whose lateral dimensions are at least five times larger than mask opening 54 and the depth of the hole, in this case the thickness of the sheet 50. The dashed lines show the etched profiles of the sidewalls using an isotropic etchant during the etching process. It can be seen that, as the etching progresses, the sidewalls become steeper. The larger the lateral dimensions of the etched hole 58 relative to the thickness of the glass sheet 50, the steeper the sidewalls. As an example, not meant to be limiting, for a glass sheet 50 of about 100 μm thick, to etch holes that are 500 μm wide, the mask hole 54 is preferably 100 μm wide. For a panel with straight channels as illustrated in FIG. 2, the holes 52 would be elongated slots extending nearly the full length of the plate 50, but would terminate at opposite sides in an annular glass border region 53 so that the plate 50 remains as an integral element except for the holes 52 in the form of parallel slots spaced apart by spacer walls 58.

FIG. 7 shows an etching modification in which the spacer walls can be made even more vertical by carrying out the etching from both sides of the plate 50. In this case, etch masks 56 are required on both sides of the plate except where the holes 58 are to be formed, and the mask holes 54 overlie one another. The dashed lines that show the etching profiles as the etching progresses shows that for a double-sided etching process, the sidewalls can be even steeper than with the single-sided etching process shown in FIG. 6.

The thickness of the channel sidewalls 58 thus produced, it will be appreciated, represents the height of the channels 20 and constitute the spacers that space the thin dielectric sheet 45 that closes off the channels from the substrate 36, and thus the reference to the apertured plate 50 as the spacer plate. The etching can be by conventional chemical etchants or by conventional plasma etching. Alternatively, a mechanical erosion process can be substituted, such as sandblasting. This may be less costly and could also be used for materials for the spacer plate 50 that are more difficult to etch.

The channel electrodes 30, 31 are separately deposited and patterned on the substrate 36 as described in the referenced papers and patents, after which the thin glass sheet 45 is attached over the apertured spacer plate 50, and the latter then aligned and attached to the substrate 36 containing the electrodes. As shown, by positioning the spacer plate wails 58 over the electrodes 30, 31, then adjacent channels 20 would share an electrode which would reduce the number of electrodes required. The walls 58 are shown with a slightly tapered shape, which would follow if the single-sided etching technique were used, as the glass surfaces closer to the mask hole 54 would etch more than the more remote glass portions. If the double-sided etching process were used, then a double taper would result.

The attaching of the thin dielectric sheet 45 to the spacer plate 50, and the attaching of the spacer plate 50 to the substrate 36 can be carried out using fused glass frit at the periphery of the structure. Alternatively, anodic bonding can be used. Anodic bonding as such is a well known process for bonding two flat surfaces of ion-containing materials, such as glass. In a typical process, the glass sheets are placed against each other and an electric field applied across them while heating them to some intermediate elevated temperature which allows glass ions to become mobile. The ions migrate to the interface between the two sheets and pulls them together. The resultant force, in the presence of heat, leads to the formation of a permanent bond between the two sheets. Typical temperatures are much lower than the softening temperature of the glass. The glass frit seal will only be necessary in the electrode area after attaching the thin sheet 45.

Figure 5:
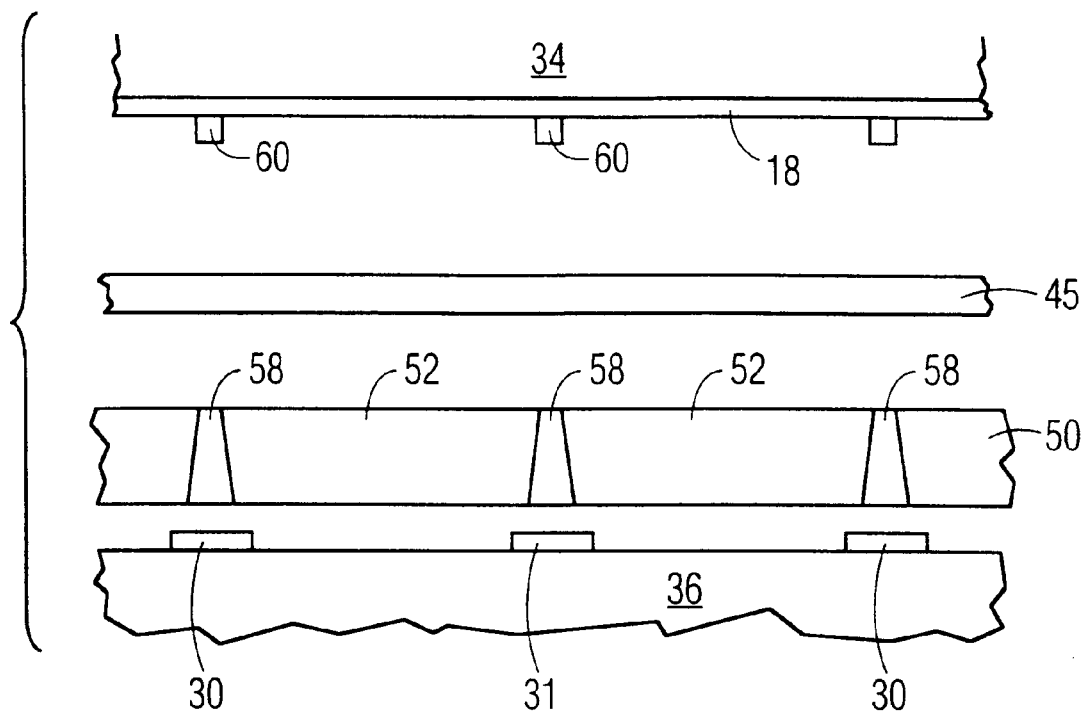
FIG. 5 is an exploded side view of the channel plate of FIG. 3.

The resultant assembled channel plate structure 52 is shown in FIG. 3. The remainder of the PALC panel can be fabricated in the usual way by filling and sealing the plasma panel and then forming the LC part of the panel on top of the thin glass sheet 45 as shown in FIG. 5 in an exploded view. The upper plate 34 may have deposited spacer members 60 which are aligned with the spacer walls 58 and act to space apart the upper structure 34 with its ITO electrodes 18 from the glass sheet 45 to provide a confined space for the LC material.

Figure 8:
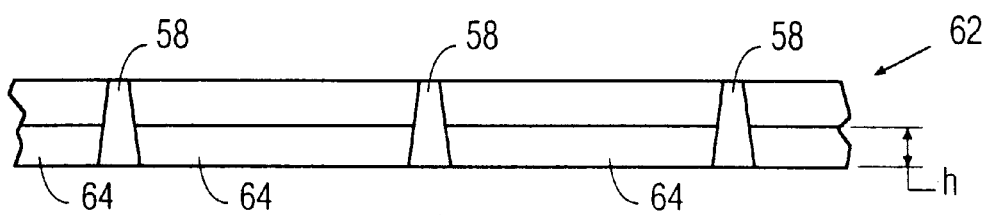
FIGS. 8 and 9 are side and top views, respectively, of part of another form of spacer plate for use in another embodiment in accordance with the invention.
Figure 9:
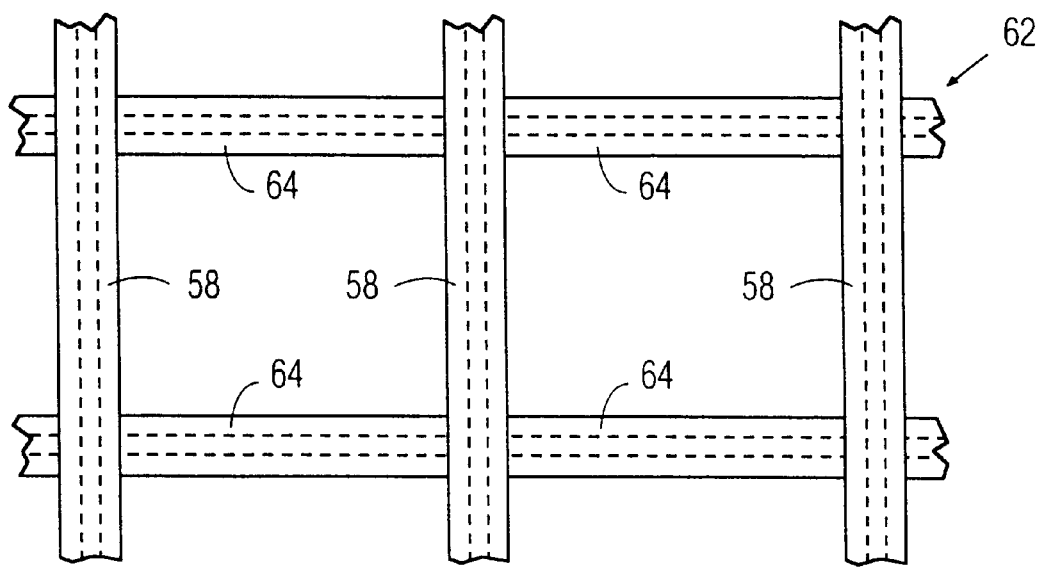

In a variation of the invention, where the width of the channels 20 may be large, it may be desirable to increase the mechanical strength of the spacer plate. This can be done by etching strengthening crossbars in a spacer plate 62. This is illustrated in FIGS. 8 and 9 at 62. The crossbars 64 which extend laterally to and between the spacer walls 58 are thus integral with the plate 62. To avoid the crossbars 64 from possibly detrimentally affecting the operation of the plasma discharge in the channels 20, their height can be reduced without reducing the height of the spacer walls 58. In the embodiment shown, the height h of the crossbars 64 is reduced from the top. The height h can be controlled by the width of the etching opening in the etch mask and the degree of the overetching. By appropriate masking and etching techniques, easily determined by those skilled in this art, the crossbars 64 can be made so that they do not extend all the way to the height of the channels 20.

The broken lines at the edges of the elements in the figures indicate that what is shown is a small section broken off from a larger assembly, since, as will be appreciated, typically a PALC display device for monitor use would contain several hundred column electrodes 18 and several hundred plasma channels 20.

It will be noted that the spacer wall portions 58 do not overlap or cover the sides of the electrically conductive layers 30, 31, which thus remain exposed and able to perform their function of igniting an electrically conductive plasma when suitable voltages are applied between them. The electrode materials are typically of a metal such as copper, or layers of Cu—Cr—Cu, or other suitable metals.

All of the methods described in the referenced patents and publication will be suitable for making the remaining parts of the panel of the invention.

The invention is generally applicable to all kinds of flat displays, and in particular to displays of the plasma-addressed type, especially PALC displays that typically have a small channel pitch for use in computer monitors, workstations or TV applications. While the main application of the channel plate of the invention is in PALC type display devices, the same plasma plate construction 52 can also be used as a plasma display device where the output is the light, generated by the plasma, which can exit the device via the transparent substrate and/or the overlying transparent sheet-like member.

Several preferred examples for the FIG. 3 embodiment are (all values are in μm): a wall width of about 20–50; a wall height of about 50–160; and a wall pitch of about 200–500.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method for making a channel plate for a flat display device, comprising:
   (a) providing a substantially transparent dielectric substrate,
   (b) providing a substantially transparent spacer plate having first and second opposed surfaces,
   (c) forming in the spacer plate a plurality of substantially equally-spaced walls each having a height substantially equal to the thickness of the spacer plate between the first and second surfaces,
   (d) bonding a thin dielectric sheet over the first surface of the spacer plate,
   (e) depositing an electrically conductive material over the substrate to form on the substrate spaced electrodes,
   (f) bonding the spacer plate via its second surface to the substrate with the spaced walls extending generally transverse to the substrate and such that at least portions of the spaced electrodes are located between each adjacent pair of walls.

2. The method of claim 1, wherein the substrate, the spacer plate, and the dielectric sheet are made of glass.

3. The method of claim 1, wherein step (c) is carried out by chemically or plasma etching slots in the spacer plate.

4. The method of claim 1, wherein step (c) is carried out by chemically etching the spacer plate using an etch mask with openings having a smaller width than the spacing between the spacer plate walls.

5. The method of claim 1, wherein step (c) is carried out by mechanically eroding slots between the spacer plate walls.

6. The method of claim 1, wherein spaced crossbars are formed in the spacer plate so as to extend laterally between flanking wall portions.

7. The method of claim 6, wherein the crossbars have a smaller height than that of the flanking wall portions.

8. The method of claim 1, wherein the bonding steps are carried out by glass frit or anodic bonding.

9. A method for making a plasma channel plate of a plasma-addressed electro-optic display device comprising a layer of electro-optic material, data electrodes coupled to the electro-optic layer and adapted to receive data voltages for activating portions of the electro-optic layer, a plurality of elongated plasma channels extending generally transverse to the data electrodes for selectively switching on said electro-optic portions, and a dielectric sheet closing off the plasma channels on the side facing the data electrodes, said plasma channels each comprising spaced elongated cathode and anode plasma electrodes and an ionizable gas filling said plasma channels, said method comprising:
   (a) providing a substantially transparent dielectric substrate,
   (b) providing a substantially transparent dielectric spacer plate having first and second opposed surfaces,
   (c) forming by etching in the spacer plate a plurality of substantially equally-spaced walls each having a height substantially equal to the thickness of the spacer plate between the first and second surfaces,
   (d) bonding a dielectric sheet over the first surface of the spacer plate,
   (e) depositing an electrically conductive material over the substrate to form on the substrate a plurality of spaced cathode and anode electrodes,
   (f) bonding the spacer plate via its second surface to the substrate with the spaced walls extending generally transverse to the substrate and such that a pair of the spaced cathode and anode electrodes are located between each adjacent pair of walls.

10. The method for making the plasma channel plate of a plasma-addressed electro-optic display device as claimed in claim 9, wherein the cathode and anode electrodes are wider than the spaced walls and the spaced walls are located over the cathode and anode electrodes such that adjacent channels share an electrode.

11. The method of claim 1, wherein the electrodes are wider than the spaced walls and the spaced walls are located over the electrodes such that adjacent channels share an electrode.

12. The method of claim 1, wherein the electrodes comprise cathode and anode electrodes formed on the substrate.

* * * * *